(12) United States Patent
Liu et al.

(10) Patent No.: US 10,542,436 B2
(45) Date of Patent: Jan. 21, 2020

(54) UNLICENSED SPECTRUM OPERATION FOR NARROWBAND INTERNET OF THINGS AND ENHANCED MACHINE TYPE COMMUNICATION

(71) Applicant: QUALCOMM Incorporated, San Diego, CA (US)

(72) Inventors: Chih-Hao Liu, San Diego, CA (US); Srinivas Yerramalli, San Diego, CA (US); Chirag Patel, San Diego, CA (US); Tamer Kadous, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 41 days.

(21) Appl. No.: 15/644,517

(22) Filed: Jul. 7, 2017

(65) Prior Publication Data

US 2018/0070243 A1    Mar. 8, 2018

Related U.S. Application Data

(60) Provisional application No. 62/383,345, filed on Sep. 2, 2016.

(51) Int. Cl.
*H04W 16/14* (2009.01)
*H04W 4/70* (2018.01)
(Continued)

(52) U.S. Cl.
CPC ............ *H04W 16/14* (2013.01); *H04L 5/14* (2013.01); *H04W 4/70* (2018.02); *H04W 74/0808* (2013.01); *H04W 76/28* (2018.02)

(58) Field of Classification Search
CPC .......... H04L 5/14; H04W 16/14; H04W 4/70; H04W 76/28; H04W 74/0808
See application file for complete search history.

(56) References Cited

U.S. PATENT DOCUMENTS 6,633,226 B1 * 10/2003 Nysen .................. G01S 13/755
340/10.1
2014/0301351 A1  10/2014 Gao et al.
(Continued)

OTHER PUBLICATIONS

Ericsson, "On Channel Access Mechanisms for NR in Unlicensed Spectrum," 3GPP TSG RAN WG1 Meeting #86, R1-167063, Gothenburg, Sweden, Aug. 2016, 2 pgs., XP051142005, 3rd Generation Partnership Project.
(Continued)

*Primary Examiner* — Khaled M Kassim
*Assistant Examiner* — Thomas R Cairns
(74) *Attorney, Agent, or Firm* — Holland & Hart LLP

(57) ABSTRACT

Methods, systems, and devices for wireless communication are described. A user equipment (UE) and base station may communicate using narrow band internet of things (NB-IoT) techniques or enhanced machine type communication (eMTC) in unlicensed spectrum. The UE may be an eMTC device or another device capable of communication without user direction. The UE may identify a geographic region and select a communication mode that is consistent with regulatory restrictions in that region. For example, in some cases, the communication mode may be based on using time division duplexing (TDD), using frequency hopping, or performing a listen-before-talk (LBT) procedure at the base station. A frame structure for TDD may include LBT subframes, uplink portions, downlink portions, and special subframes for switching. The base station may perform LBT procedures in the LBT subframes. If frequency hopping is enabled, a configurable number of TDD frames may be grouped into a hopping frame block.

30 Claims, 14 Drawing Sheets

(51) Int. Cl.
*H04W 76/28* (2018.01)
*H04L 5/14* (2006.01)
*H04W 74/08* (2009.01)

(56) References Cited

U.S. PATENT DOCUMENTS

2015/0305037 A1     10/2015  Zhang et al.
2018/0220404 A1*     8/2018  Awad .................. H04W 72/042

OTHER PUBLICATIONS

Huawei et al., "Support of Flexible Bandwidth," 3GPP TSG RAN WG1 Meeting #86, R1-166106, Gothenburg, Sweden, Aug. 22-26, 2016, 6 pgs., 3rd Generation Partnership Project.
ISA/EP, International Search Report and Written Opinion of the International Searching Authority, Int'l Application No. PCT/US2017/041353, dated Oct. 4, 2017, European Patent Office, Rijswijk, NL, 16 pgs.

* cited by examiner

UNLICENSED SPECTRUM OPERATION FOR NARROWBAND INTERNET OF THINGS AND ENHANCED MACHINE TYPE COMMUNICATION

CROSS REFERENCES

The present application for patent claims priority to U.S. Provisional Patent Application No. 62/383,345 by Liu, et al., entitled "Unlicensed Spectrum Operation For Narrowband Internet of Things and Enhanced Machine Type Communication," filed Sep. 2, 2016, assigned to the assignee hereof.

BACKGROUND

The following relates generally to wireless communication and more specifically to unlicensed spectrum operation for narrowband internet of things (NB-IoT) and enhanced machine type communication (eMTC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system). A wireless multiple-access communications system may include a number of base stations, each simultaneously supporting communication for multiple communication devices, which may be otherwise known as user equipment (UE).

Some wireless systems support narrowband communication configurations such as NB-IoT and eMTC in licensed radio frequency spectrum. However, regulatory restrictions for communication in unlicensed spectrum may impose limitations that impact narrowband communications. This may reduce the efficiency of narrowband communications.

SUMMARY

A user equipment (UE) and base station may communicate using narrow band internet of things (NB-IoT) techniques or enhanced machine type communication (eMTC) in unlicensed spectrum. The UE may be an eMTC device or another device capable of communication without user direction. The UE may identify a geographic region and select a communication mode that is consistent with regulatory restrictions in that region. For example, in some cases, the communication mode may be based on using time division duplexing (TDD), using frequency hopping, or performing listen-before-talk (LBT) procedures at the base station. A frame structure for TDD may include LBT subframes, uplink portions, downlink portions, special subframes for switching, or any combination of these. The base station may perform LBT procedures in the LBT subframes. If frequency hopping is enabled, a configurable number of TDD frames may be grouped into a hopping frame block.

A method of wireless communication is described. The method may include identifying one or more narrowband regions of an unlicensed radio frequency spectrum band for communication with a wireless device, determining a geographic operating region for the wireless device, selecting a communication mode from a plurality of communication modes for communication in the unlicensed radio frequency spectrum band based at least in part on the geographic operating region for the wireless device, wherein the communication mode comprises at least one of a frequency hopping configuration, an LBT configuration, or a discontinuous transmission (DTX) duty cycle, and communicating with the wireless device in the one or more narrowband regions of the unlicensed radio frequency spectrum band using the communication mode.

An apparatus for wireless communication is described. The apparatus may include means for identifying one or more narrowband regions of an unlicensed radio frequency spectrum band for communication with a wireless device, means for determining a geographic operating region for the wireless device, means for selecting a communication mode from a plurality of communication modes for communication in the unlicensed radio frequency spectrum band based at least in part on the geographic operating region for the wireless device, wherein the communication mode comprises at least one of a frequency hopping configuration, an LBT configuration, or a DTX duty cycle, and means for communicating with the wireless device in the one or more narrowband regions of the unlicensed radio frequency spectrum band using the communication mode.

Another apparatus for wireless communication is described. The apparatus may include a processor, memory in electronic communication with the processor, and instructions stored in the memory. The instructions may be executable by the processor to cause the apparatus to identify one or more narrowband regions of an unlicensed radio frequency spectrum band for communication with a wireless device, determine a geographic operating region for the wireless device, select a communication mode from a plurality of communication modes for communication in the unlicensed radio frequency spectrum band based at least in part on the geographic operating region for the wireless device, wherein the communication mode comprises at least one of a frequency hopping configuration, an LBT configuration, or a DTX duty cycle, and communicate with the wireless device in the one or more narrowband regions of the unlicensed radio frequency spectrum band using the communication mode.

A non-transitory computer readable medium for wireless communication is described. The non-transitory computer-readable medium may include instructions operable to cause a processor to identify one or more narrowband regions of an unlicensed radio frequency spectrum band for communication with a wireless device, determine a geographic operating region for the wireless device, select a communication mode from a plurality of communication modes for communication in the unlicensed radio frequency spectrum band based at least in part on the geographic operating region for the wireless device, wherein the communication mode comprises at least one of a frequency hopping configuration, an LBT configuration, or a DTX duty cycle, and communicate with the wireless device in the one or more narrowband regions of the unlicensed radio frequency spectrum band using the communication mode.

Some examples of the method, apparatus, and non-transitory computer-readable medium described above may further include processes, features, means, or instructions for receiving a system information broadcast in one of the narrowband regions, wherein the communication mode or geographic operating region may be identified based at least in part on the system information broadcast.

Some examples of the method, apparatus, and non-transitory computer-readable medium described above may further include processes, features, means, or instructions for transmitting a system information broadcast in one of the narrowband regions, wherein the system information broadcast identifies the communication mode or geographic operating region.

In some examples of the method, apparatus, and non-transitory computer-readable medium described above, the communication mode may be based at least in part on a regulatory restriction of the geographic operating region. In some examples of the method, apparatus, and non-transitory computer-readable medium described above, the communication mode may be selected based at least in part on a capability or category of the wireless device.

Some examples of the method, apparatus, and non-transitory computer-readable medium described above may further include processes, features, means, or instructions for transmitting an indication of the capability or category of the wireless device.

In some examples of the method, apparatus, and non-transitory computer-readable medium described above, the capability or category of the wireless device comprises an NB-IoT or eMTC capability or category.

Some examples of the method, apparatus, and non-transitory computer-readable medium described above may further include processes, features, means, or instructions for identifying a number of frequency hopping channels based at least in part on the communication mode, wherein communicating in the one or more narrowband regions of the unlicensed radio frequency spectrum band may be based at least in part on the number of frequency hopping channels.

Some examples of the method, apparatus, and non-transitory computer-readable medium described above may further include processes, features, means, or instructions for identifying a TDD frame structure based at least in part on the LBT configuration, wherein communicating in the one or more narrowband regions of the unlicensed radio frequency spectrum band may be based at least in part on the TDD frame structure.

In some examples of the method, apparatus, and non-transitory computer-readable medium described above, the LBT configuration comprises an active LBT configuration, and the TDD frame structure includes at least one LBT gap.

In some examples of the method, apparatus, and non-transitory computer-readable medium described above, the LBT configuration comprises an inactive LBT configuration, and the TDD frame structure includes a combination of uplink or downlink transmission time intervals (TTIs) and excludes an LBT gap.

In some examples of the method, apparatus, and non-transitory computer-readable medium described above, the communication comprises communicating in a first narrowband region of the one or more narrowband regions of the unlicensed radio frequency spectrum band during a first TDD frame having the TDD frame structure. Some examples of the method, apparatus, and non-transitory computer-readable medium described above may further include processes, features, means, or instructions for communicating in a second narrowband region of the one or more narrowband regions of the unlicensed radio frequency spectrum band during a second TDD frame having the TDD frame structure.

In some examples of the method, apparatus, and non-transitory computer-readable medium described above, the TDD frame structure comprises a downlink portion and an uplink portion separated by at least one special TTI.

Some examples of the method, apparatus, and non-transitory computer-readable medium described above may further include processes, features, means, or instructions for identifying a DTX configuration based at least in part on the DTX duty cycle. Some examples of the method, apparatus, and non-transitory computer-readable medium described above may further include processes, features, means, or instructions for entering an idle mode based at least in part on the DTX configuration.

DETAILED DESCRIPTION

Wireless devices and systems may be configurable to support narrowband communication, such as narrow band internet of things (NB-IoT) communication or enhanced machine type communication (eMTC), in unlicensed radio frequency spectrum bands in different jurisdictions. Systems and devices within the systems may account for varying regulatory restrictions for communication in unlicensed spectrum that may impose limitations that impact narrowband communications.

Different regions or countries may impose different or changing restrictions on a duty cycle for discontinuous transmission (DTX), frequency hopping, or listen-before-talk (LBT) procedures. If a device operates using a communication mode designed to comply with one set of restrictions, it may operate inefficiently, or violate different restrictions, if it subsequently moves to another geographic region. Thus, a narrowband user equipment (UE) may select one mode from a number of different communication modes for operating in unlicensed spectrum in different geographic regions.

By way of example, a UE may first identify a geographic region and then select a communication mode that is consistent with regulatory restrictions in that region. In some cases, the communication mode may be based on using time division duplexing (TDD), using frequency hopping, or performing an LBT procedure at the base station. A fixed frame structure for TDD may include LBT subframes, uplink portions, downlink portions, and special subframes for switching. The base station may perform LBT in the LBT subframes. If frequency hopping is enabled, a configurable number of TDD frames may be grouped into a hopping frame block.

Aspects of the disclosure introduced above are described below in the context of a wireless communications system. An example of a TDD frame structure and an example process flow for selection of a narrowband communication mode are then described. Aspects of the disclosure are further illustrated by and described with reference to apparatus diagrams, system diagrams, and flowcharts that relate to unlicensed spectrum operation for NB-IoT and eMTC.

Figure 1:
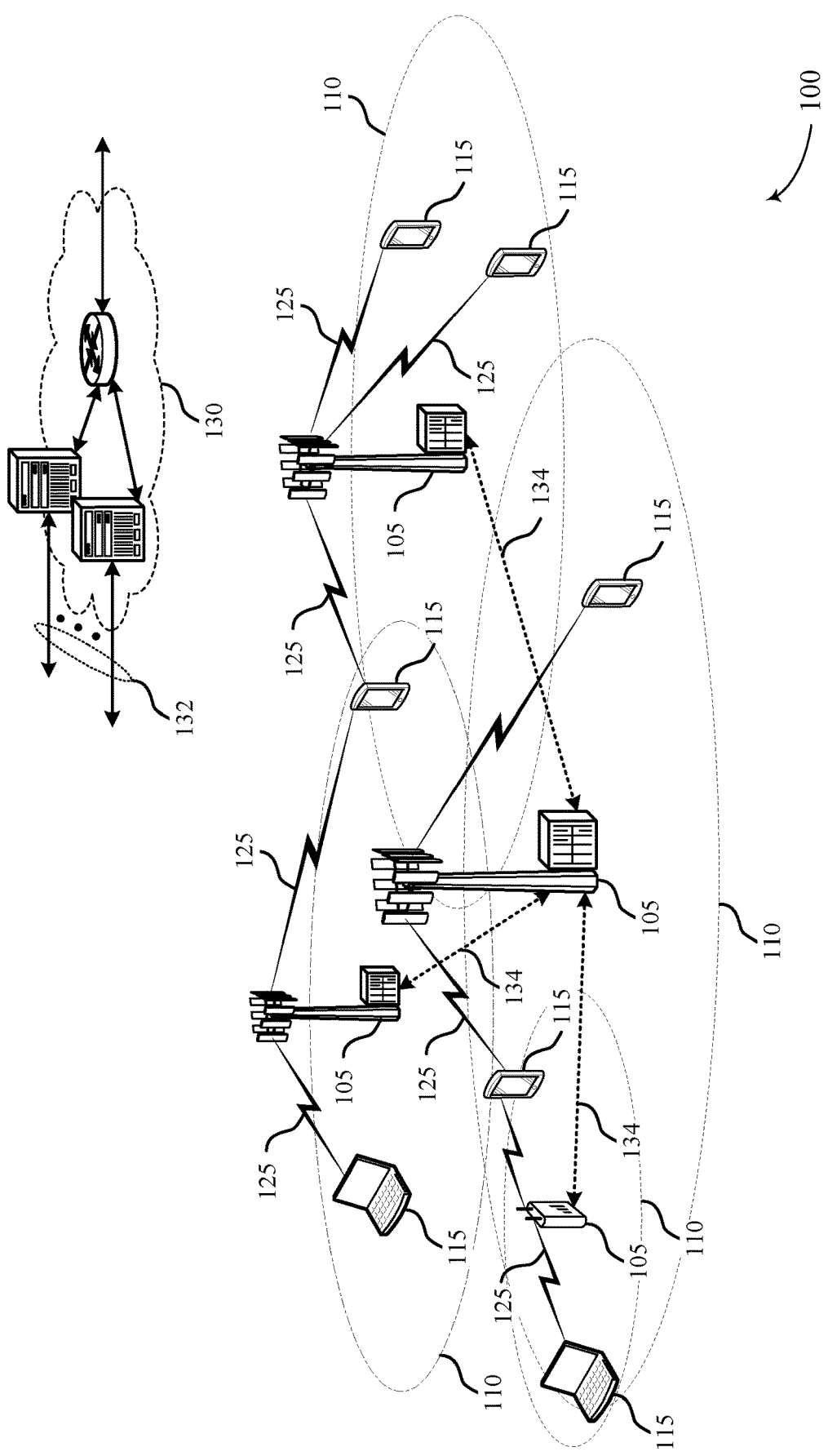
FIGS. 1 and 2 illustrate examples of wireless communications systems that support unlicensed spectrum operation for narrowband internet of things (NB-IoT) and enhanced machine type communication (eMTC) in accordance with various aspects of the present disclosure.

FIG. 1 illustrates an example of a wireless communications system 100 that supports unlicensed spectrum operation for NB-IoT and eMTC in accordance with various aspects of the present disclosure. The wireless communications system 100 includes base stations 105, UEs 115, and a core network 130. In some examples, the wireless communications system 100 may be a Long Term Evolution (LTE) or LTE-Advanced (LTE-A) network. The wireless communication system 100 may support unlicensed spectrum operation for NB-IoT and eMTC between UEs 115 and base stations 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105 or downlink transmissions from a base station 105 to a UE 115. UEs 115 may be dispersed throughout the wireless communications system 100, and each UE 115 may be stationary or mobile.

A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 115 may be capable of narrowband communication, and may be a cellular phone, a personal digital assistant (PDA), a wireless modem, a wireless communication device, a handheld device, a tablet computer, a laptop computer, a cordless phone, a personal electronic device, a personal computer, a wireless local loop (WLL) station, an Internet of things (IoT) device, an Internet of Everything (IoE) device, a machine type communication (MTC) device, an appliance, an automobile, or the like. Some UEs 115 may be wearable devices, such as personal biometric or fitness monitors, location tracking devices, sensors, monitors, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Time intervals in LTE may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

In some cases, wireless system 100 may utilize both licensed and unlicensed radio frequency spectrum bands. For example, wireless system 100 may employ LTE License Assisted Access (LTE-LAA) or LTE Unlicensed (LTE-U) radio access technology in an unlicensed band, such as the 5 GHz Industrial, Scientific, and Medical (ISM) band. When operating in unlicensed radio frequency spectrum bands, wireless devices such as base stations 105 and UEs 115 may employ LBT procedures to ensure the channel is clear before transmitting data. Operations in unlicensed spectrum may include downlink transmissions, uplink transmissions, or both. Duplexing in unlicensed spectrum may be based on frequency division duplexing (FDD), TDD, or a combination of both.

Devices operating in a shared or unlicensed frequency spectrum may perform an LBT procedure such as a clear channel assessment (CCA) prior to communicating in order to determine whether the channel is available. A CCA may include an energy detection procedure of the channel to determine whether there are any other active transmissions on the channel. For example, the device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

As mentioned, some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate.

MTC devices may also be configured to enter a power saving deep sleep mode when not engaging in active communications.

An eMTC device may operate using half-duplex (one-way) communications at a reduced peak rate. eMTC devices may also be configured to enter a power saving "deep sleep" mode when not engaging in active communications. An eMTC deployment may provide resource flexibility and may use some channels associated with an LTE/LTE-A system and other channels in an unlicensed spectrum. In some examples, eMTC devices may communicate over a scalable bandwidth (e.g., between one (1) resource block (RB) and six (6) RBs), and eMTC devices may have a maximum data rate of one (1) Mbps. eMTC devices may be power limited and may support features that limit power usage. However, an acquisition procedure for the transition of an eMTC device from an idle mode to a connected mode may be power consuming. Additionally, an eMTC device may be designed for operation in an in-band deployment mode, and physical (PHY) layer, medium access control (MAC) layer, and upper layer procedures at the eMTC device may be cumbersome and power consuming when operating in a standalone deployment mode (e.g., in an unlicensed spectrum).

NB-IoT devices may include a subset of low power devices that support a higher maximum coupling loss (MCL) and may include synchronization channels that support power boosting for faster cell acquisition and searching when compared to eMTC devices. These features may allow for increased efficiency for operation of NB-IoT devices in a standalone deployment mode (e.g., in an unlicensed spectrum) when compared to eMTC devices. Additionally, an acquisition procedure for the transition of an NB-IoT device from an idle mode to a connected mode may not be as power consuming as the same procedure for an eMTC device. Accordingly, in some cases, it may be appropriate to support NB-IoT processes for eMTC devices.

Some NB-IoT devices may not support communication over a scalable bandwidth. Instead, NB-IoT devices may communicate using a range of resources between one (1) subcarrier (or tone) and one (1) RB with a maximum data rate of 66 Kbps for uplink communication. In some cases, this range of resources may not conform to the minimum bandwidth requirement for operation in an unlicensed spectrum. Additionally, this range of resources may not allow a device to transmit within the maximum allowable power for transmission in an unlicensed spectrum. NB-IoT devices and eMTC devices may be regionally configured for licensed spectrum transmission, but the devices may not be regionally configured for unlicensed spectrum. Therefore, wireless communications system 100 may introduce unlicensed spectrum operation for NB-IoT and eMTC communications.

In some cases a UE 115, such as a NB-IoT device may identify a geographic region and select a communication mode that is consistent with regulatory restrictions in that region. For example, in some cases, the communication mode may be based on using TDD, using frequency hopping, or performing an LBT procedure at the base station. A fixed frame structure for TDD may include LBT subframes, uplink portions, downlink portions, and special subframes for switching. A base station 105 may perform an LBT procedure in the LBT subframes. If frequency hopping is enabled, a configurable number of TDD frames may be grouped into a hopping frame block.

Figure 2:
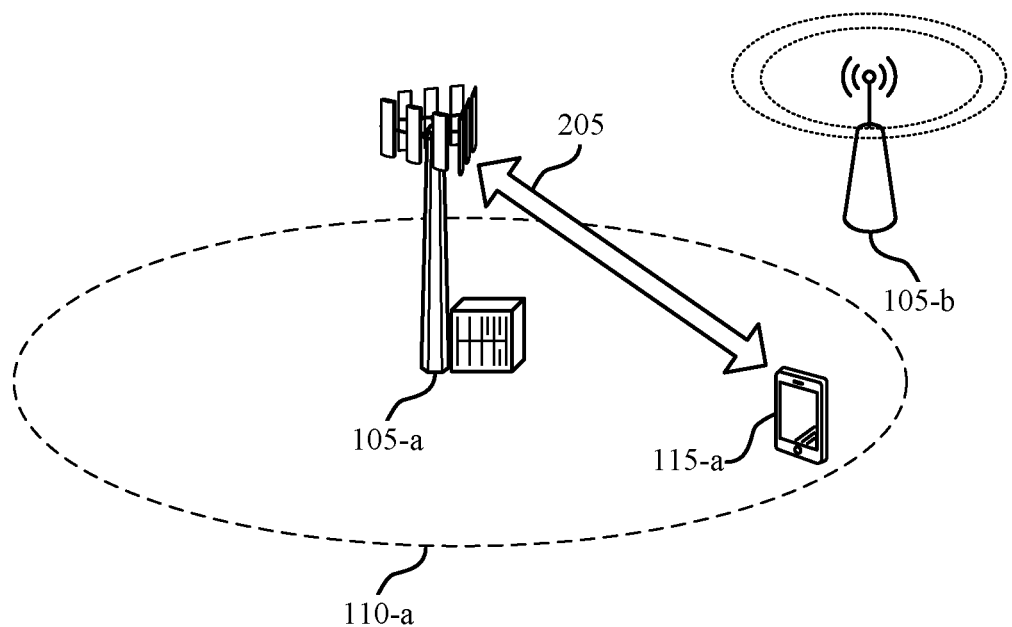

FIG. 2 illustrates an example of a wireless communications system 200 that supports unlicensed spectrum operation for NB-IoT and eMTC in accordance with various aspects of the present disclosure. Wireless communications system 200 may include UE 115-*a* and base stations 105-*a* and 105-*b*, which may be respective examples of a UE 115 and base stations 105 as described with reference to FIG. 1. UE 115-*a* may be located within geographic coverage area 110-*a* for base station 105-*a*. UE 115-*a* and base station 105-*a* may determine a communication mode for communication and communicate (e.g., over communication link 205) using unlicensed spectrum NB-IoT or eMTC based on the communication mode. For example, they may operate in a sub-1 GHz radio frequency or at 2.4 GHz radio frequency. In some cases, narrowband operation in unlicensed spectrum may be constrained by legal regulations that vary by location.

For example, UE 115-*a* may operate with a configurable duty cycle (that corresponds to local restrictions), and may have a configurable discontinuous transmission (DTX) cycle period based on the duty cycle. Some wireless systems may regulate the duty cycle of UE 115-*a*. For example, if regulations permit UE 115-*a* a 1% duty cycle, UE 115-*a* may operate for a relatively short time, and UE 115-*a* may be in DTX and barred from transmission for the rest of the time. In some examples, UE 115-*a* may not perform LBT procedures when operating under a DTX configuration.

Base station 105-*a* may perform LBT procedures based on regional regulations (e.g., to detect signals sent or received at neighboring base station 105-*b*). Base station 105-*a* may perform LBT procedures in LBT designated subframes. The LBT parameters may be configurable based on regional regulations and a frequency band of operation. Base station 105-*a* may also have a configurable DTX period based on the duty cycle.

UE 115-*a* and base station 105-*a* may use a TDD waveform with a fixed frame structure. The fixed TDD frame may be a configurable length. The fixed TDD frame may include LBT subframes, downlink subframes, uplink subframes, and special subframes. The LBT subframes may include LBT gaps and channel reservation signaling from a base station 105. The LBT subframes may provide sufficient time for an LBT procedure before frequency hopping. The fixed frame structure may include a configurable number of LBT subframes. For example, if base station 105-*a* does not perform LBT procedures, the LBT subframes may be used as downlink subframes. The LBT subframes may be used as uplink subframes if the LBT subframes follow uplink subframes.

The fixed TDD frame may include bursts of uplink and downlink subframes. The ratio of downlink subframes to uplink subframes may be configurable, and the length of the downlink subframe portion may be based on a specified channel occupancy time. The fixed TDD frame may include bursts of uplink and downlink subframes to reduce a number of switches between uplink and downlink, which may reduce switching costs for low cost UEs 115. The fixed TDD frame may include special subframes used for downlink to uplink switching.

Base station 105-*a* may configure frequency hopping for NB-IoT or eMTC. In some cases, wireless communication regulations may restrict frequency hopping in some frequency bands. A number of hopping channels may be configurable. If hopping is enabled, a configurable number of TDD frames may be grouped into a hopping frame block. Each hopping frame block may be at a static frequency (e.g., UE 115-*a* or base station 105-*a* initiates frequency hopping before or after the hopping frame block). The number of frames in the hopping frame block may be based on a maximum dwell time of each hopping channel. A hopping sequence may be known by UE 115-*a* and base station 105-*a*.

Table 1 details exemplary configurations for NB-IoT communication and eMTC in 2.4 GHz radio frequency based on possible regional regulations.

TABLE 1

Example Configurations for a 2.4 GHz Band

| Region | NB-IoT modes (2.4 GHz) | eMTC modes (2.4 GHz) |
|---|---|---|
| US | 1. Base station and UE with frequency hopping (FH) | 1. Base station and UE with non-FH<br>2. Base station and UE with FH |
| EU | 1. base station with LBT and UE with 10% duty cycle (DC)<br>2. Base station and UE with 10% DC | 1. Base station with LBT and UE with 10% DC<br>2. Base station and UE with 10% DC<br>3. Base station with LBT + FH and UE with 10% DC + FH |
| China | All modes | All modes |

Table 2 details exemplary configurations for NB-IoT communication and eMTC in sub 1 GHz radio frequency based on possible regional regulations.

TABLE 2

Example Configurations for a Sub-1 GHz Band

| Region | NB-IoT modes (Sub-1 GHz) | eMTC modes (Sub-1 GHz) |
|---|---|---|
| America | 1. Base station and UE with FH | 1. Base station and UE with non-FH<br>2. Base station and UE with FH |
| EU | 1. Base station with LBT and UE with 1% or 0.1% DC<br>2. Base station with 10% DC (for example 869.4 to 869.65 MHz) and UE with 10% or 1% DC<br>3. Base station with 1% DC and UE with 1% or 0.1% DC | 1. Base station with LBT and UE with 1% or 0.1% DC<br>2. Base station with 1% DC and UE with 1% or 0.1% DC |
| Korea | 1. Base station and UE are deployed with FH (or)<br>2. Base station with LBT and UE with DC | Not supported |
| Japan | 1. Base station with LBT and UE with DC (or)<br>2. Base station and UE with DC | Not supported |
| China | All modes | All modes |
| India | All modes | All modes |

Figure 3:
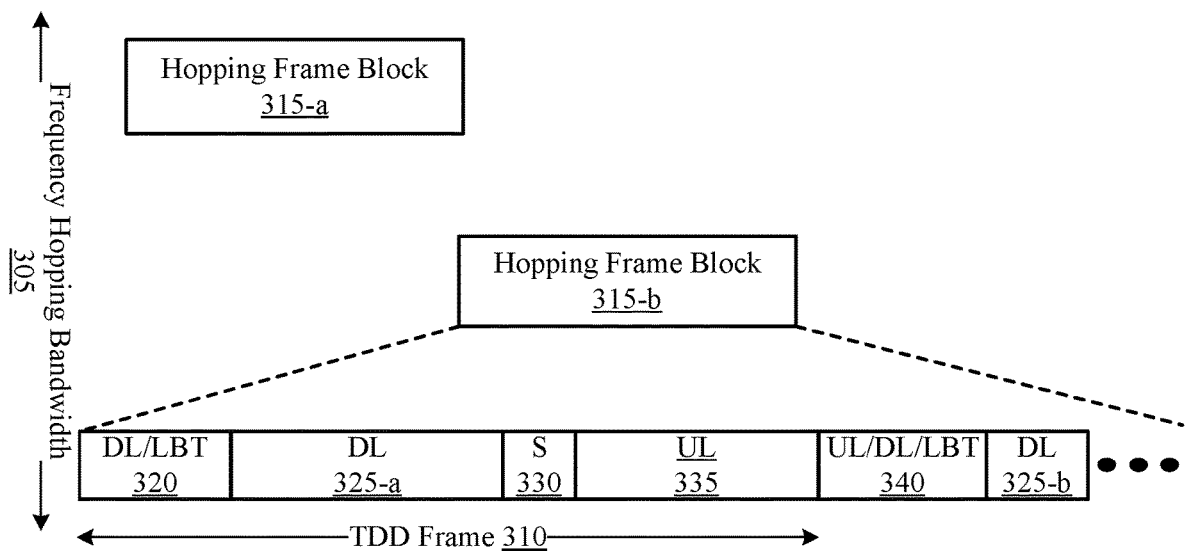
FIG. 3 illustrates an example of a time division duplexing (TDD) frame structure that supports unlicensed spectrum operation for NB-IoT and eMTC in accordance with various aspects of the present disclosure.

FIG. 3 illustrates an example of a TDD frame structure 300 that supports unlicensed spectrum operation for NB-IoT and eMTC in accordance with various aspects of the present disclosure. A TDD frame structure 300 may be used for NB-IoT communication between a UE 115 and a base station 105. In some examples, a TDD frame may be enabled for frequency hopping.

Frequency hopping may occur within a frequency hopping bandwidth 305. Certain regional regulations may restrict frequency hopping of an allocated bandwidth. A TDD frame 310 may have a configurable duration. The TDD frame 310 may include a configurable set of subframes. If frequency hopping is enabled, one or more TDD frames 310 may be grouped as a hopping frame block 315.

Hopping frame block 315-*a* may be at a first frequency in the frequency hopping bandwidth 305. A number of TDD frames 310 in hopping frame block 315-*a* may be based on a maximum dwell time of the channel. Hopping frame block 315-*a* may include a configurable set of subframes (e.g., LBT, downlink, special, and uplink).

Hopping frame block 315-*b* may be at a second frequency in the frequency hopping bandwidth 305. As depicted, hopping frame block 315-*b* may include a configurable number of TDD frames 310 including a configurable set of subframes.

Hopping frame block 315-*b* may include downlink/LBT subframes 320. The downlink/LBT subframes 320 may include LBT gaps and allow for channel reservation signaling from a base station 105. The downlink/LBT subframes 320 may allow for LBT sensing prior to hopping to a new frequency in the frequency hopping bandwidth 305. The number of LBT subframes (e.g., included in the downlink/LBT subframes 320 and uplink/downlink/LBT subframes 340) may be configurable based on regional regulations. If a base station does not enable LBT procedures, the downlink/LBT subframes 320 may be used as downlink subframes instead.

Downlink subframes 325 (e.g., downlink subframes 325-*a* and downlink subframes 325-*b*) may include bursts of downlink subframes. The burst of downlink subframes may, for example, facilitate a downlink channel with high repetition and reduced UL/DL switching in the TDD frame 310. Similarly, uplink subframes 335 may include bursts of uplink subframes. The burst of uplink subframes may, for example, facilitate an uplink channel with high repetition and reduced UL/DL switching in the TDD frame 310. Within a TDD frame 310, the ratio of downlink subframes 325-*a* to uplink subframes 335 may be configurable. A number of downlink subframes 325 included in the TDD frame 310 may be based on a channel occupancy duration (e.g., a duration of hopping frame block 315-*b*).

Special subframes 330 may be used for downlink to uplink switching. Uplink/downlink/LBT subframes 340 may be similar to downlink/LBT subframes 320. However, an LBT subframe may only be used for uplink communication if the LBT subframe occurs after an uplink portion. The LBT functionalities of the uplink/downlink/LBT subframes 340 may be the same as the LBT functionalities of the downlink/LBT subframes 320. The uplink/downlink/LBT subframes 340 may be the start of a TDD frame 310.

Figure 4:
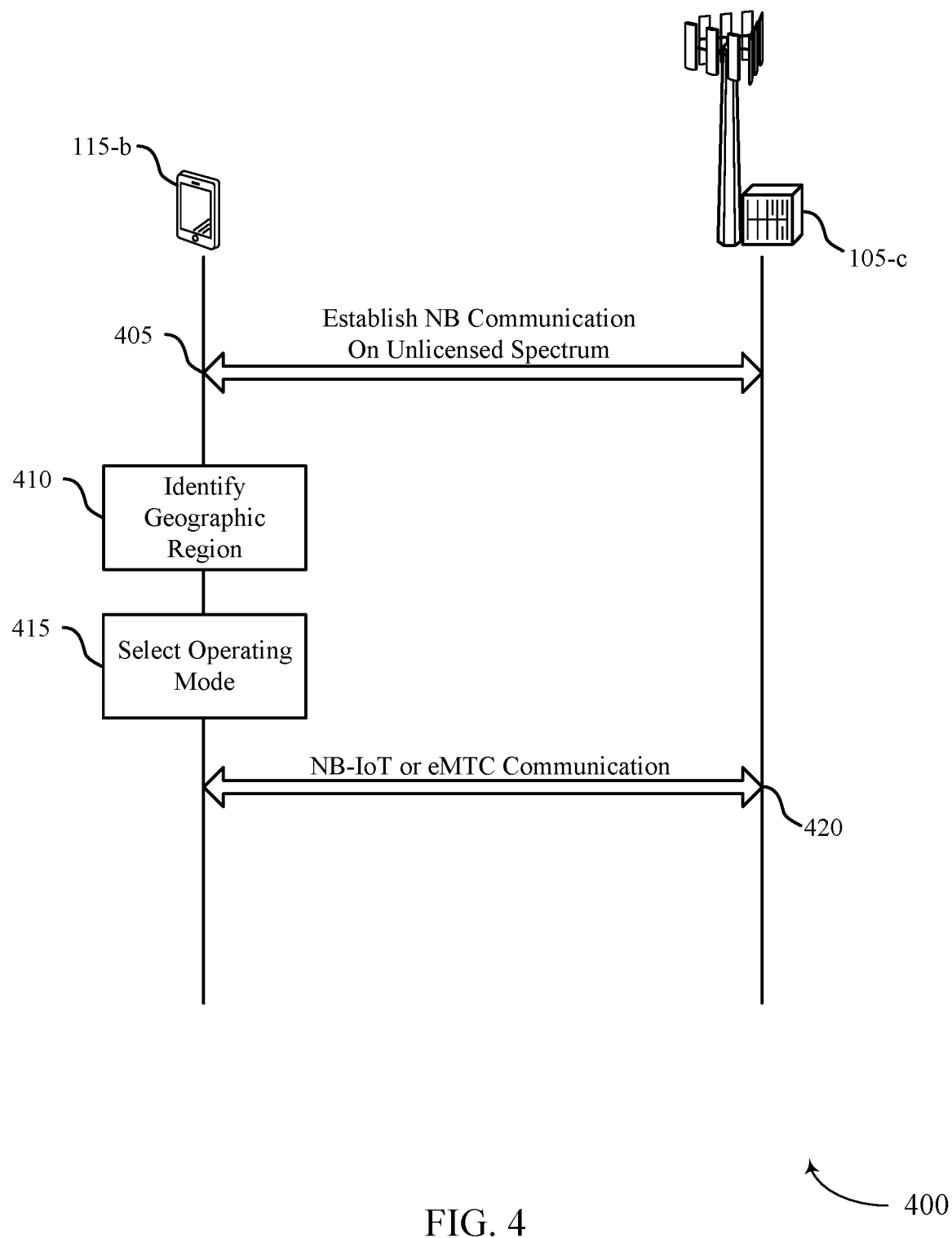
FIG. 4 illustrates an example of a process flow 400 that supports unlicensed spectrum operation for NB-IoT and eMTC in accordance with various aspects of the present disclosure.

FIG. 4 illustrates an example of a process flow 400 that supports unlicensed spectrum operation for NB-IoT and eMTC in accordance with various aspects of the present disclosure. Process flow 400 may include UE 115-b and base station 105-c, which may be respective examples of a UE 115 and base station 105 as described with reference to FIG. 1.

At 405, UE 115-b and base station 105-c may establish narrowband communication on unlicensed spectrum. UE 115-b or base station 105-c may identify one or more narrowband regions of an unlicensed radio frequency spectrum band.

At 410, UE 115-b may identify a geographic operating region of communication. In some examples, a communication mode of the communication system may be based on the geographic operating region or a regulatory restriction of the geographic operating region. In some examples, base station 105-c may identify the geographic operating region of communication (e.g., using a global positioning system (GPS)).

At 415, UE 115-b may select a communication mode for unlicensed spectrum NB-IoT communication or eMTC. UE 115-b may select the communication mode from multiple communication modes for communication in the unlicensed radio frequency spectrum band, where the communication mode includes at least one of a frequency hopping configuration, an LBT configuration, or a DTX duty cycle. The communication mode may be based on a geographic operating region determined at 410. The communication mode may be based on a regulatory restriction of the geographic operating region. In some cases, the communication mode may be selected based on a capability or category of a wireless device (e.g., UE 115-b or base station 105-c). In some cases, base station 105-c may instead select the communication mode for unlicensed spectrum NB-IoT communication or eMTC. For example, UE 115-b may transmit one or more capabilities of UE 115-b (e.g., via radio resource control (RRC) signaling) to base station 105-c, and base station 105-c may select the communication mode based on the capabilities.

At 420, UE 115-b and base station 105-c may communication using NB-IoT communication or eMTC based on the selected communication mode.

Figure 5:
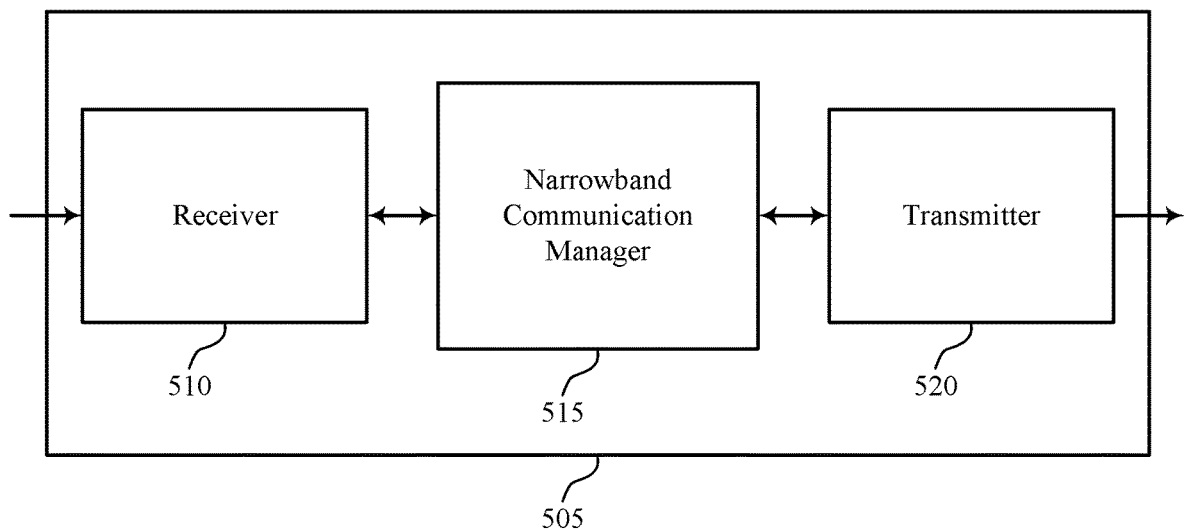
FIGS. 5 through 7 show block diagrams of a device or devices that support unlicensed spectrum operation for NB-IoT and eMTC in accordance with various aspects of the present disclosure.

FIG. 5 shows a block diagram 500 of a wireless device 505 that supports unlicensed spectrum operation for NB-IoT and eMTC in accordance with various aspects of the present disclosure. Wireless device 505 may be an example of aspects of a UE 115 or base station 105 as described with reference to FIG. 1. Wireless device 505 may include receiver 510, narrowband communication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, information related to unlicensed spectrum operation for NB-IoT and eMTC, etc.). Information may be passed on to other components of the device. The receiver 510 may be an example of aspects of the transceiver 835 described with reference to FIG. 8. Receiver 510 may communicate in one or more narrowband regions of an unlicensed radio frequency spectrum band using a selected communication mode. In some cases, the communication includes communicating in a first narrowband region of one or more narrowband regions of the unlicensed radio frequency spectrum band during a first TDD frame having a certain TDD frame structure, and communicating in a second narrowband region of the one or more narrowband regions of the unlicensed radio frequency spectrum band during a second TDD frame having the certain TDD frame structure.

Narrowband communication manager 515 may be an example of aspects of the UE narrowband communication manager 815 described with reference to FIG. 8. Narrowband communication manager 515 may identify the one or more narrowband regions of the unlicensed radio frequency spectrum band and select the communication mode from a set of communication modes for communication in the unlicensed radio frequency spectrum band, where the communication mode includes at least one of a frequency hopping configuration, an LBT configuration, or a DTX duty cycle.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas. In some cases, the transmitter 520 may communicate in the one or more narrowband regions of the unlicensed radio frequency spectrum band using the selected communication mode.

Figure 6:
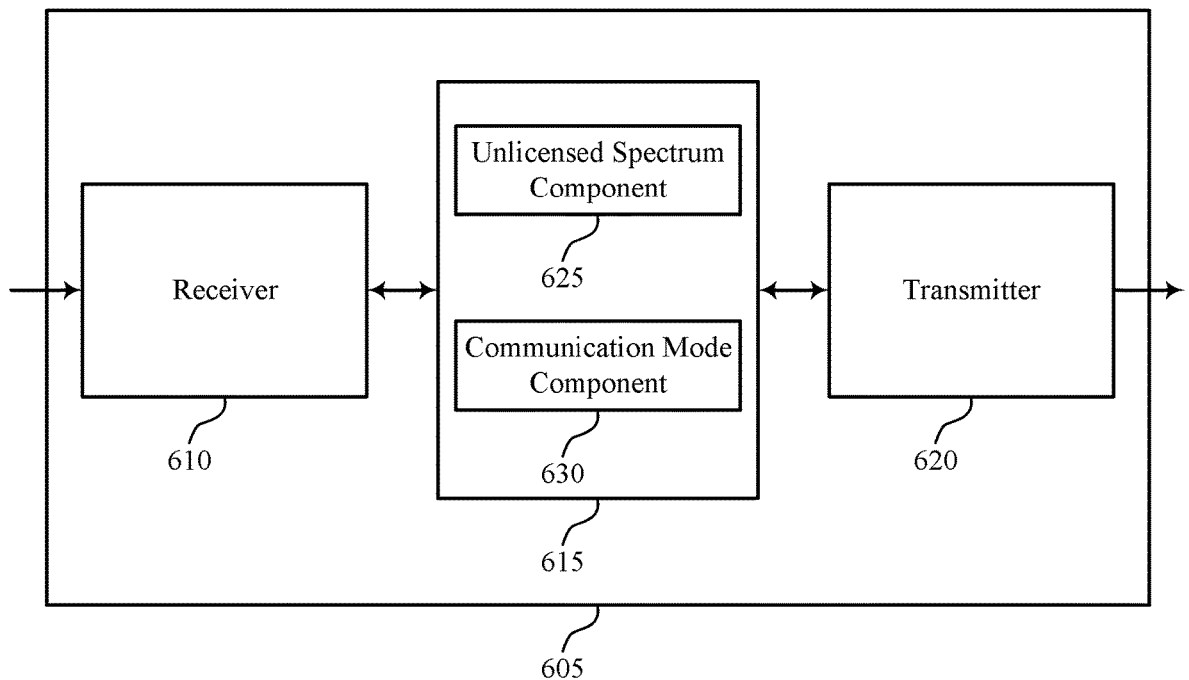

FIG. 6 shows a block diagram 600 of a wireless device 605 that supports unlicensed spectrum operation for NB-IoT and eMTC in accordance with various aspects of the present disclosure. Wireless device 605 may be an example of aspects of a wireless device 505 or a UE 115 or base station 105 as described with reference to FIGS. 1 and 5. Wireless device 605 may include receiver 610, narrowband communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, information related to unlicensed spectrum operation for NB-IoT and eMTC, etc.). Information may be passed on to other components of the device. The receiver 610 may be an example of aspects of the transceiver 835 as described with reference to FIG. 8.

Narrowband communication manager 615 may be an example of aspects of the narrowband communication manager 815 as described with reference to FIG. 8. Narrowband communication manager 615 may also include unlicensed spectrum component 625 and communication mode component 630. Unlicensed spectrum component 625 may identify one or more narrowband regions of an unlicensed radio frequency spectrum band.

Communication mode component 630 may select a communication mode from a set of communication modes for communication in the unlicensed radio frequency spectrum band, where the communication mode includes at least one of a frequency hopping configuration, an LBT configuration, or a DTX duty cycle.

In some cases, the communication mode is based on a regulatory restriction of the geographic operating region. In some cases, the communication mode is selected based on a capability or category of a wireless device. In some cases, the LBT configuration includes an active LBT configuration, and the TDD frame structure includes at least one LBT gap, which may be a period of time during which a base station or UE performs a CCA procedure or otherwise confirms that a transmission medium is available. In some cases, the LBT configuration includes an inactive LBT configuration (i.e., LBT procedure is not performed in the inactive LBT configuration), and the TDD frame structure includes a combination of uplink or downlink transmission time intervals (TTIs) and excludes an LBT TTI.

Transmitter 620 may transmit signals generated by other components of the device. In some examples, the transmitter 620 may be collocated with a receiver 610 in a transceiver module. For example, the transmitter 620 may be an example of aspects of the transceiver 835 as described with reference to FIG. 8. The transmitter 620 may include a single antenna, or it may include a set of antennas.

Figure 7:
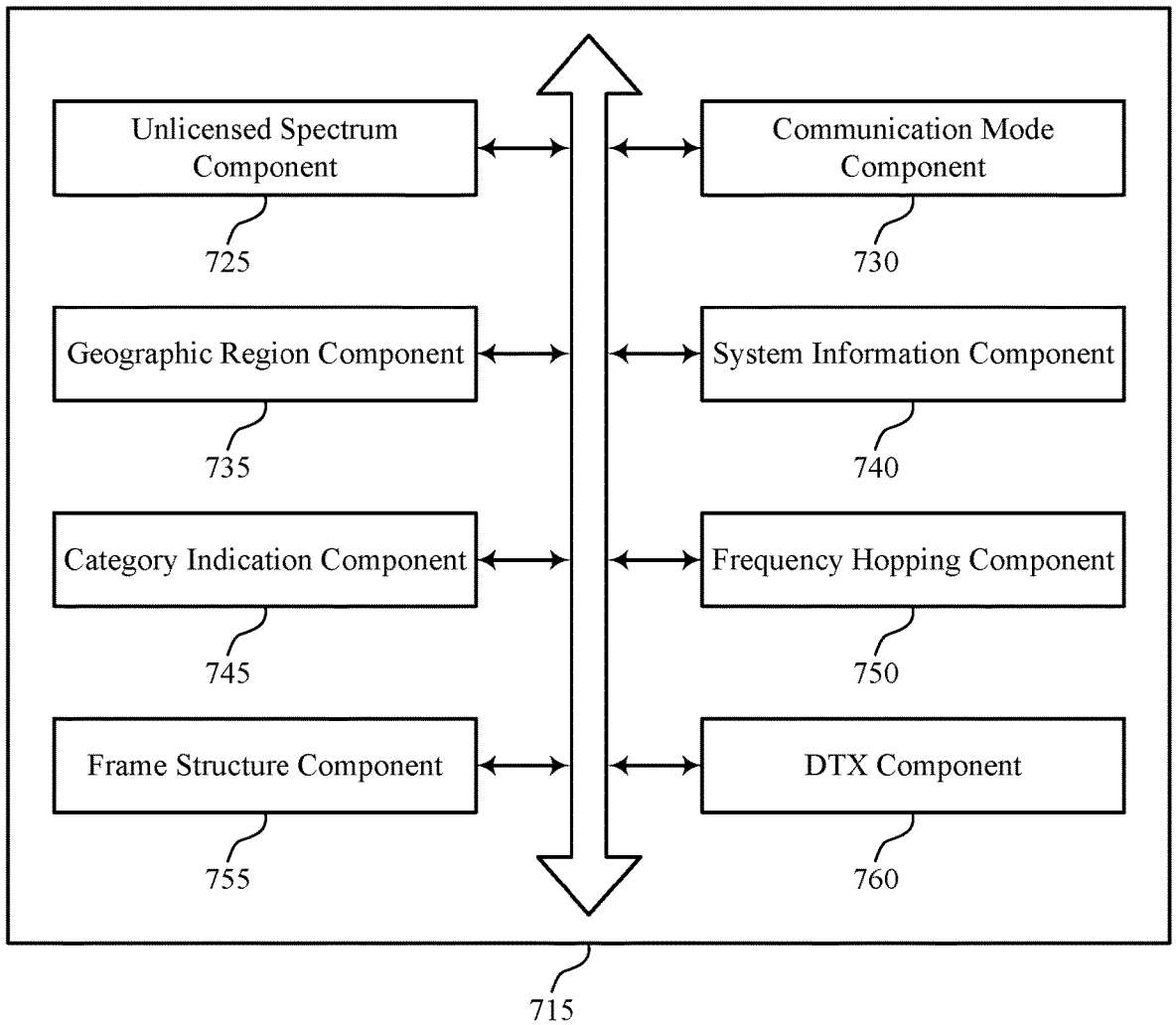

FIG. 7 shows a block diagram 700 of a narrowband communication manager 715 that supports unlicensed spectrum operation for NB-IoT and eMTC in accordance with various aspects of the present disclosure. The narrowband communication manager 715 may be an example of aspects of a narrowband communication manager 515, a narrowband communication manager 615, or a narrowband communication manager 815 as described with reference to FIGS. 5, 6, and 8. The narrowband communication manager 715 may include unlicensed spectrum component 725, communication mode component 730, geographic region component 735, system information component 740, category indication component 745, frequency hopping component 750, frame structure component 755, and DTX component 760. Each of these modules may communicate, directly or indirectly, with one another (e.g., via one or more buses).

Unlicensed spectrum component 725 may identify one or more narrowband regions of an unlicensed radio frequency spectrum band. Communication mode component 730 may select a communication mode from a set of communication modes for communication in the unlicensed radio frequency spectrum band, where the communication mode includes at least one of a frequency hopping configuration, an LBT configuration, or a DTX duty cycle.

Geographic region component 735 may determine a geographic operating region for a wireless device, where the communication mode is selected based on the geographic operating region. System information component 740 may receive a system information broadcast in the one or more narrowband regions, where the communication mode or geographic operating region is identified based on the system information broadcast, and may transmit a system information broadcast in the one or more narrowband regions, where the system information broadcast identifies the communication mode or geographic operating region.

Category indication component 745 may transmit an indication of the capability or category of the wireless device. In some cases, the capability or category of the wireless device includes an NB-IoT or eMTC capability or category.

Frequency hopping component 750 may identify a number of frequency hopping channels based on the selected communication mode, where communicating in the one or more narrowband regions of the unlicensed radio frequency spectrum band is based on the number of frequency hopping channels.

Frame structure component 755 may identify a TDD frame structure based on the LBT configuration, where communicating in the one or more narrowband regions of the unlicensed radio frequency spectrum band is based on the TDD frame structure. In some cases, the TDD frame structure includes a downlink portion and an uplink portion separated by at least one special TTI.

DTX component 760 may identify a DTX configuration based on the DTX duty cycle and enter an idle mode based on the DTX configuration.

Figure 8:
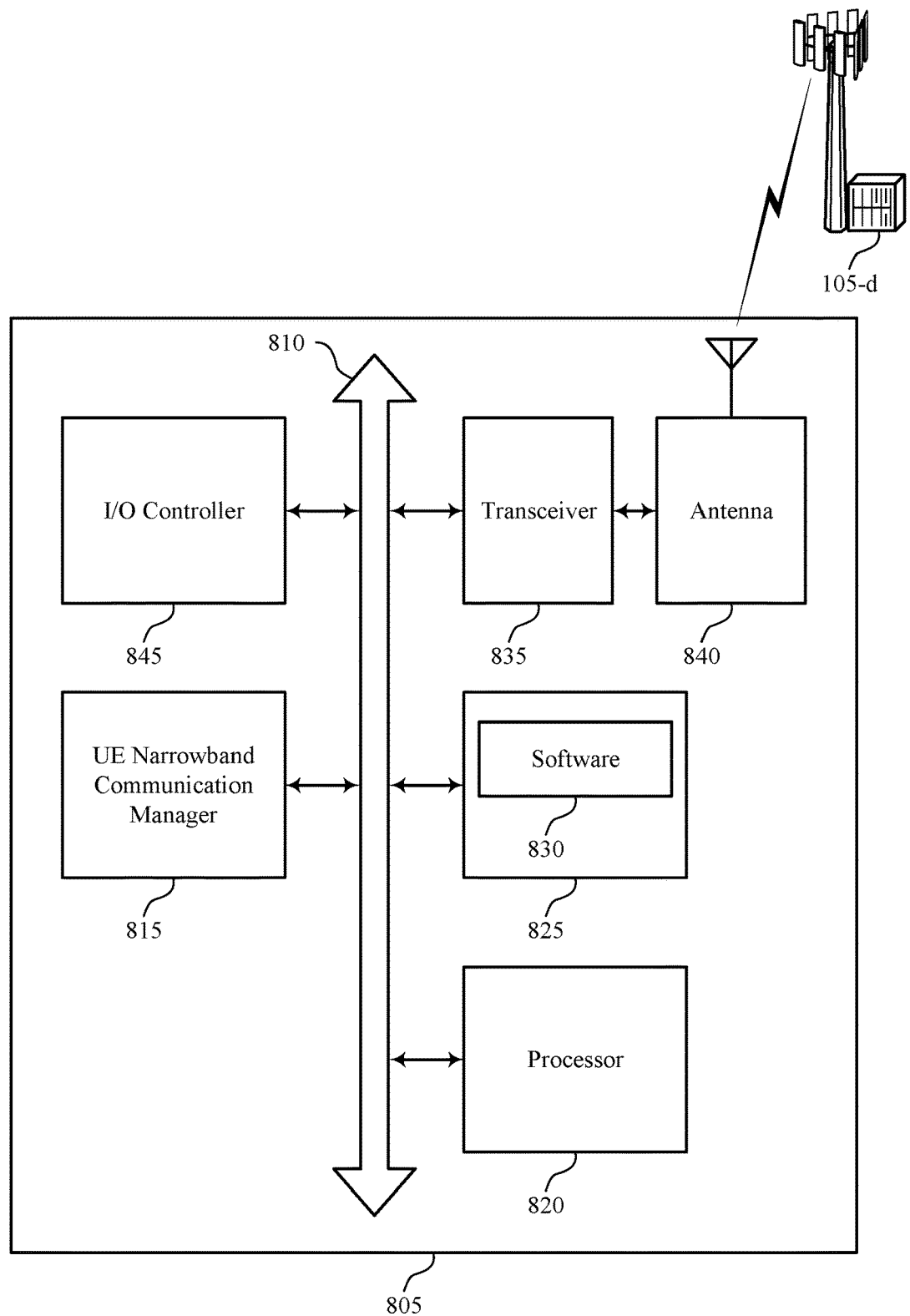
FIG. 8 illustrates a block diagram of a system, including a user equipment (UE), that supports unlicensed spectrum operation for NB-IoT and eMTC in accordance with various aspects of the present disclosure.

FIG. 8 shows a diagram of a system 800 including a device 805 that supports unlicensed spectrum operation for NB-IoT and eMTC in accordance with various aspects of the present disclosure. Device 805 may be an example of or include the components of wireless device 505, wireless device 605, or a UE 115 as described above, e.g., with reference to FIGS. 1, 5, and 6. Device 805 may include components for bi-directional voice and data communications including components for transmitting and receiving communications, including UE narrowband communication manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105 (e.g., base station 105-*d*).

UE narrowband communication manager 815 may be an example of a narrowband communication manager 515, 615, or 715, as described with reference to FIGS. 5, 6, and 7, and may perform some or all of the processes described above.

Processor 820 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting unlicensed spectrum operation for NB-IoT and eMTC).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support unlicensed spectrum operation for NB-IoT and eMTC. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas 840, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas 840 for transmission, and to demodulate packets received from the antennas 840.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
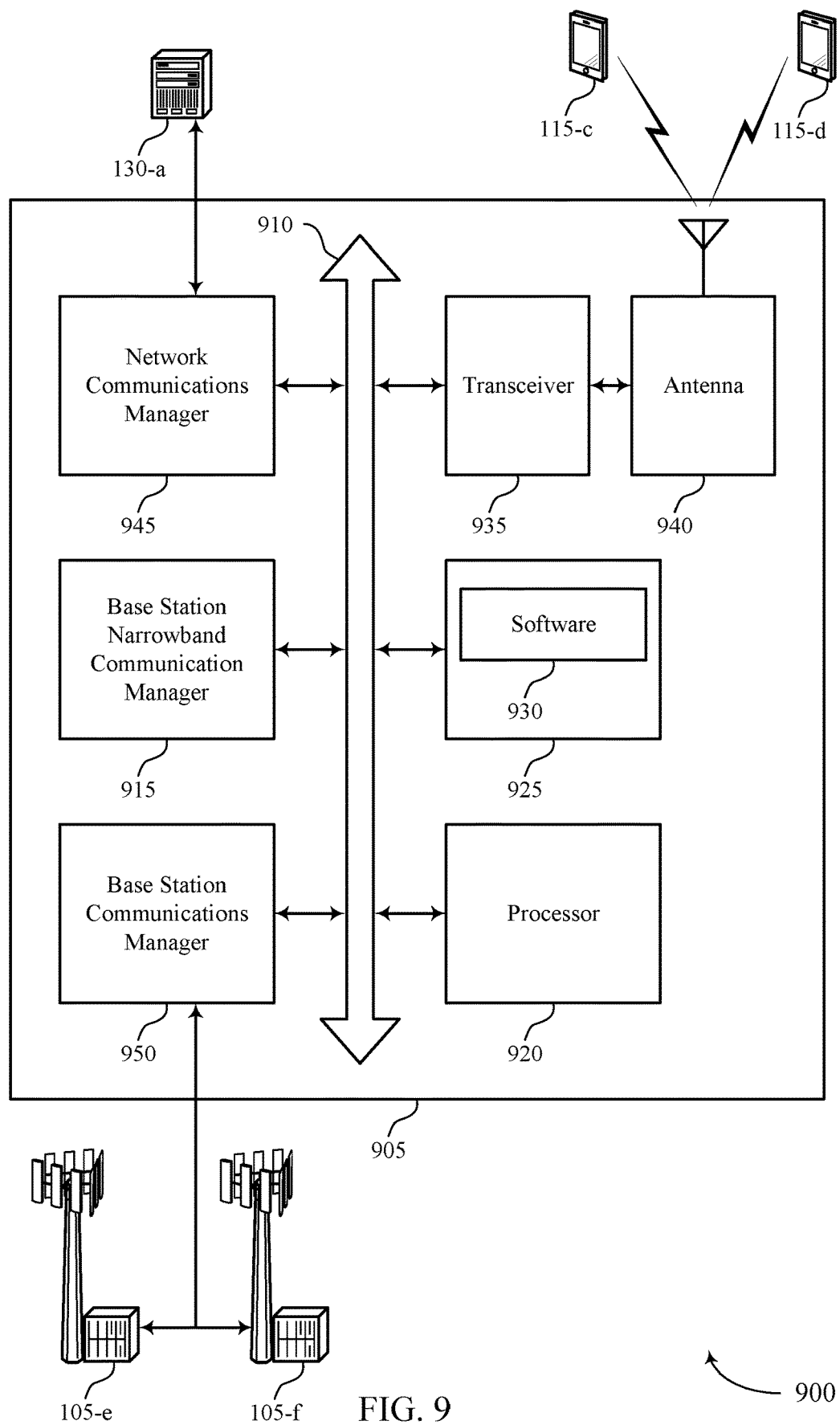
FIG. 9 illustrates a block diagram of a system, including a base station, that supports unlicensed spectrum operation for NB-IoT and eMTC in accordance with various aspects of the present disclosure.

FIG. 9 shows a block diagram of a system 900 including a device 905 that supports unlicensed spectrum operation for NB-IoT and eMTC in accordance with various aspects of the present disclosure. Device 905 may be an example of or include the components of wireless device 505, wireless device 705, or a base station 105 as described above, e.g., with reference to FIGS. 1, 5, and 7. Device 905 may include components for bi-directional voice and data communications including components for transmitting and receiving communications, including base station narrowband communication manager 915, processor 920, memory 925, software 930, transceiver 935, antenna 940, network communications manager 945, and base station communications manager 950. These components may be in electronic communication via one or more busses (e.g., bus 910). Device 905 may communicate wirelessly with one or more UEs 115 (e.g., UE 115-c and UE 115-d).

Base station narrowband communication manager 815 may be an example of a narrowband communication manager 515, 615, or 715, as described with reference to FIGS. 5, 6, and 7, and may perform some or all of the processes described above.

Processor 920 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting unlicensed spectrum operation for NB-IoT and eMTC).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware and/or software operation such as the interaction with peripheral components or devices.

Software 930 may include code to implement aspects of the present disclosure, including code to support unlicensed spectrum operation for NB-IoT and eMTC. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas 940, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas 940 for transmission, and to demodulate packets received from the antennas 940.

In some cases, the wireless device may include a single antenna 940. However, in some cases the device may have more than one antenna 940, which may be capable of concurrently transmitting or receiving multiple wireless transmissions.

Network communications manager 945 may manage communications with the core network 130-a (e.g., via one or more wired backhaul links). For example, the network communications manager 945 may manage the transfer of data communications for client devices, such as one or more UEs 115.

Base station communications manager 950 may manage communications with other base station 105 (e.g., base stations 105-e and 105-f), and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between base stations 105.

Figure 10:
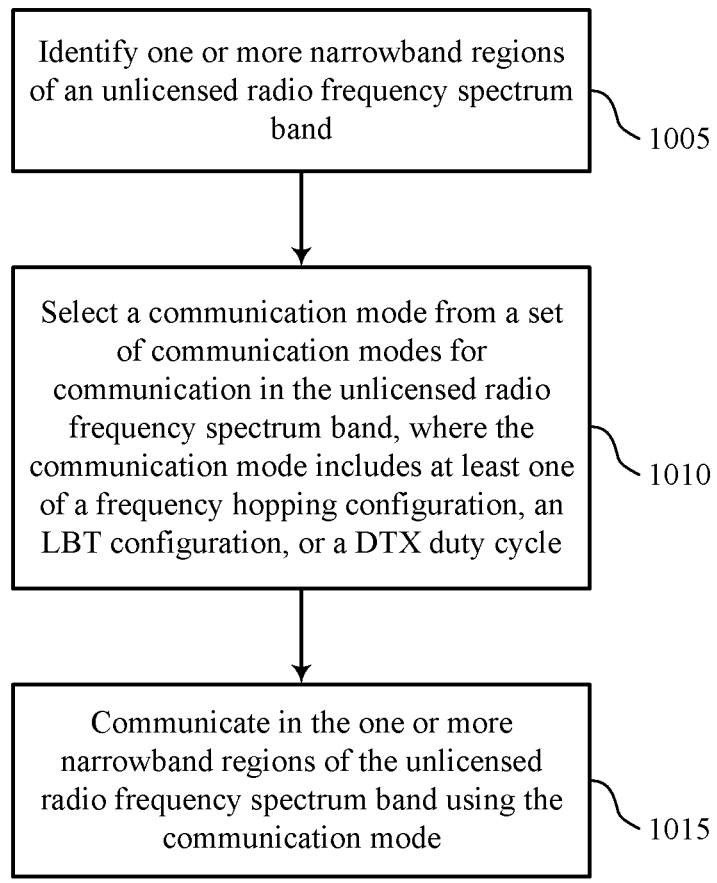
FIGS. 10 through 14 illustrate methods for unlicensed spectrum operation for NB-IoT and eMTC in accordance with various aspects of the present disclosure.

FIG. 10 shows a flowchart illustrating a method 1000 for unlicensed spectrum operation for NB-IoT and eMTC in accordance with various aspects of the present disclosure. The operations of method 1000 may be implemented by a UE 115 or base station 105 or its components as described herein. For example, the operations of method 1000 may be performed by a narrowband communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005 the UE 115 or base station 105 may identify one or more narrowband regions of an unlicensed radio frequency spectrum band. The operations of block 1005 may be performed according to the methods described with reference to FIGS. 1 through 4. In certain examples, aspects of the operations of block 1005 may be performed by an unlicensed spectrum component as described with reference to FIGS. 5 through 7.

At block 1010 the UE 115 or base station 105 may select a communication mode from a plurality of communication modes for communication in the unlicensed radio frequency spectrum band, wherein the communication mode comprises at least one of a frequency hopping configuration, an LBT configuration, or a DTX duty cycle. The operations of block 1010 may be performed according to the methods described with reference to FIGS. 1 through 4. In certain examples, aspects of the operations of block 1010 may be performed by a communication mode component as described with reference to FIGS. 5 through 7.

At block 1015 the UE 115 or base station 105 may communicate in the one or more narrowband regions of the unlicensed radio frequency spectrum band using the communication mode. The operations of block 1015 may be performed according to the methods described with reference to FIGS. 1 through 4. In certain examples, aspects of the operations of block 1015 may be performed by a receiver or a transmitter as described with reference to FIGS. 5 through 7.

Figure 11:
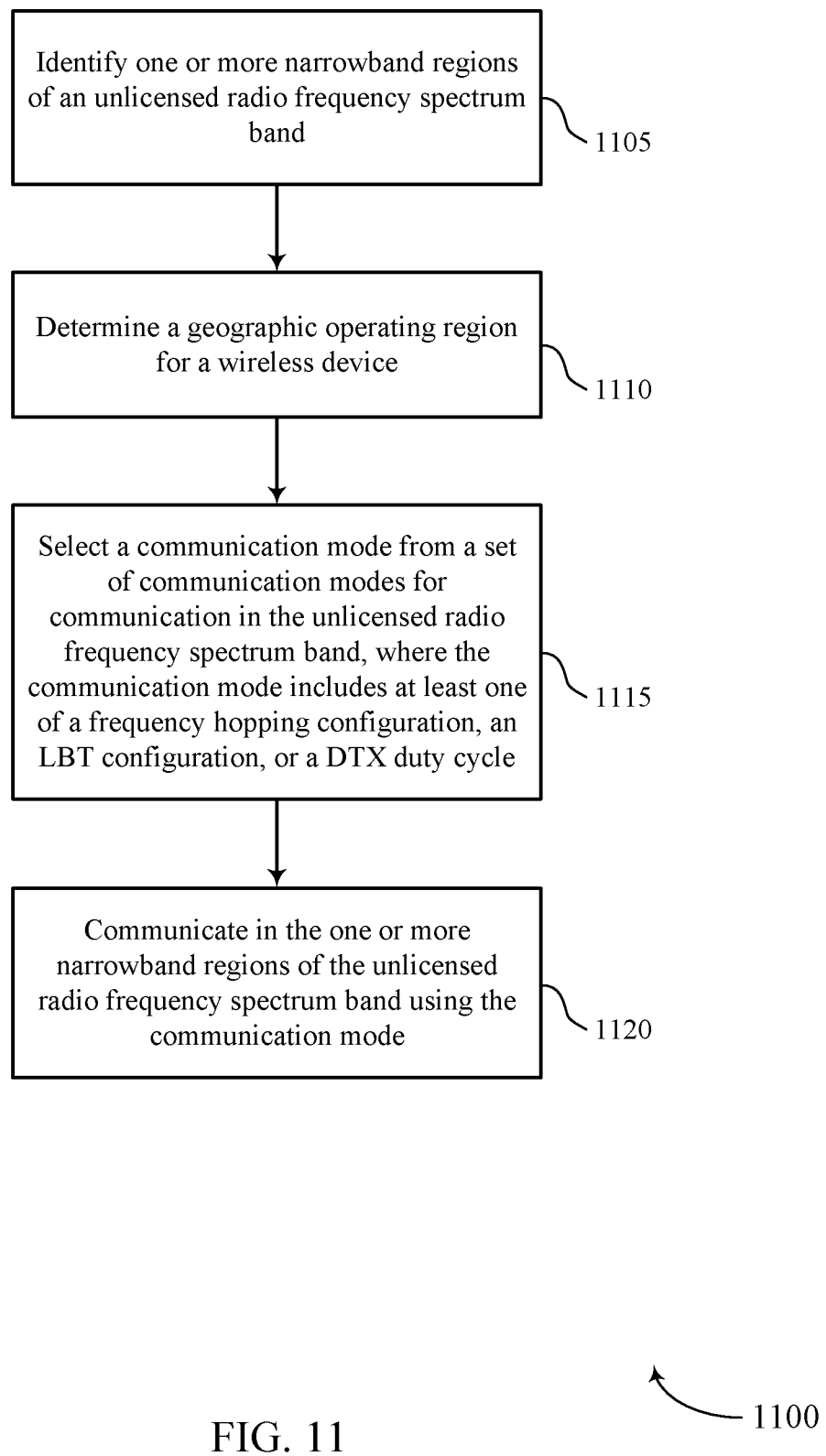

FIG. 11 shows a flowchart illustrating a method 1100 for unlicensed spectrum operation for NB-IoT and eMTC in accordance with various aspects of the present disclosure. The operations of method 1100 may be implemented by a UE 115 or base station 105 or its components as described herein. For example, the operations of method 1100 may be performed by a narrowband communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may identify one or more narrowband regions of an unlicensed radio frequency spectrum band. The operations of block 1105 may be performed according to the methods described with reference to FIGS. 1 through 4. In certain examples, aspects of the operations of block 1105 may be performed by an unlicensed spectrum component as described with reference to FIGS. 5 through 7.

At block 1110 the UE 115 or base station 105 may determine a geographic operating region for a wireless device, wherein a communication mode is selected based at least in part on the geographic operating region. The operations of block 1110 may be performed according to the methods described with reference to FIGS. 1 through 4. In certain examples, aspects of the operations of block 1110 may be performed by a geographic region component as described with reference to FIGS. 5 through 7.

At block 1115 the UE 115 or base station 105 may select the communication mode from a plurality of communication modes for communication in the unlicensed radio frequency spectrum band, wherein the communication mode comprises at least one of a frequency hopping configuration, an LBT configuration, or a DTX duty cycle. The operations of block 1115 may be performed according to the methods described with reference to FIGS. 1 through 4. In certain examples, aspects of the operations of block 1115 may be performed by a communication mode component as described with reference to FIGS. 5 through 7.

At block 1120 the UE 115 or base station 105 may communicate in the one or more narrowband regions of the unlicensed radio frequency spectrum band using the communication mode. The operations of block 1120 may be performed according to the methods described with reference to FIGS. 1 through 4. In certain examples, aspects of the operations of block 1120 may be performed by a receiver or a transmitter as described with reference to FIGS. 5 through 7.

Figure 12:
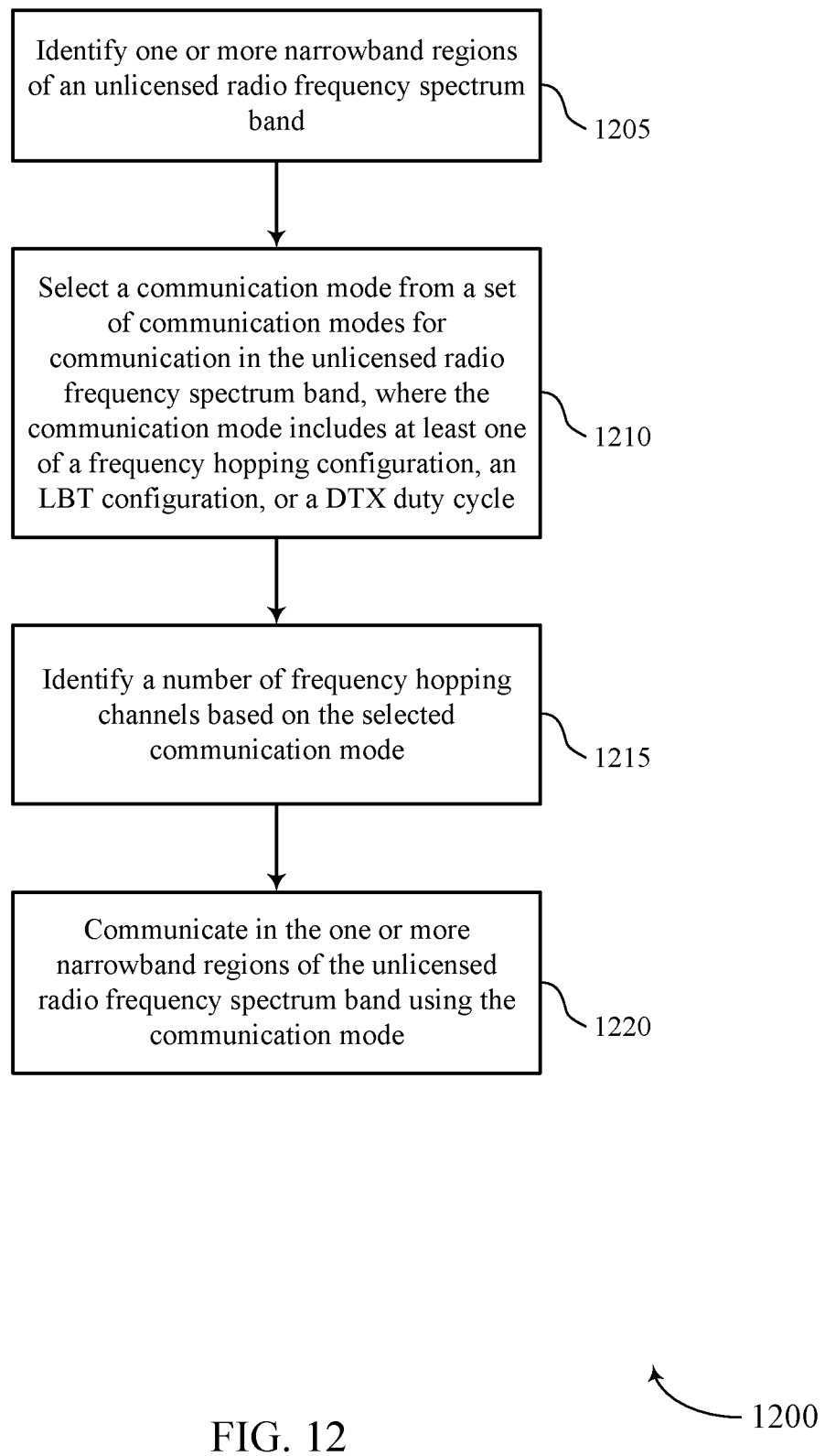

FIG. 12 shows a flowchart illustrating a method 1200 for unlicensed spectrum operation for NB-IoT and eMTC in accordance with various aspects of the present disclosure. The operations of method 1200 may be implemented by a UE 115 or base station 105 or its components as described herein. For example, the operations of method 1200 may be performed by a narrowband communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may identify one or more narrowband regions of an unlicensed radio frequency spectrum band. The operations of block 1205 may be performed according to the methods described with reference to FIGS. 1 through 4. In certain examples, aspects of the operations of block 1205 may be performed by an unlicensed spectrum component as described with reference to FIGS. 5 through 7.

At block 1210 the UE 115 or base station 105 may select a communication mode from a plurality of communication modes for communication in the unlicensed radio frequency spectrum band, wherein the communication mode comprises at least one of a frequency hopping configuration, an LBT configuration, or a DTX duty cycle. The operations of block 1210 may be performed according to the methods described with reference to FIGS. 1 through 4. In certain examples, aspects of the operations of block 1210 may be performed by a communication mode component as described with reference to FIGS. 5 through 7.

At block 1215 the UE 115 or base station 105 may identify a number of frequency hopping channels based at least in part on the selected communication mode, wherein communicating in the one or more narrowband regions of the unlicensed radio frequency spectrum band is based at least in part on the number of frequency hopping channels. The operations of block 1215 may be performed according to the methods described with reference to FIGS. 1 through 4. In certain examples, aspects of the operations of block 1215 may be performed by a frequency hopping component as described with reference to FIGS. 5 through 7.

At block 1220 the UE 115 or base station 105 may communicate in the one or more narrowband regions of the unlicensed radio frequency spectrum band using the communication mode. The operations of block 1220 may be performed according to the methods described with reference to FIGS. 1 through 4. In certain examples, aspects of the operations of block 1220 may be performed by a receiver or a transmitter as described with reference to FIGS. 5 through 7.

Figure 13:
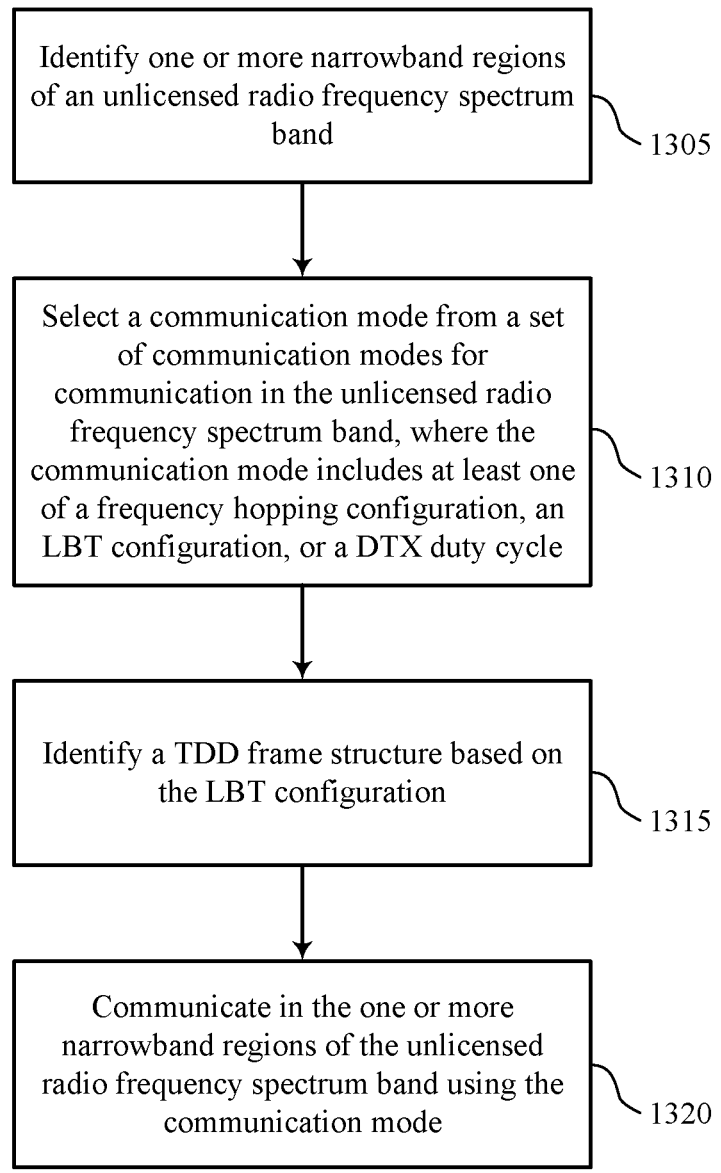

FIG. 13 shows a flowchart illustrating a method 1300 for unlicensed spectrum operation for NB-IoT and eMTC in accordance with various aspects of the present disclosure. The operations of method 1300 may be implemented by a UE 115 or base station 105 or its components as described herein. For example, the operations of method 1300 may be performed by a narrowband communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may identify one or more narrowband regions of an unlicensed radio frequency spectrum band. The operations of block 1305 may be performed according to the methods described with reference to FIGS. 1 through 4. In certain examples, aspects of the operations of block 1305 may be performed by an unlicensed spectrum component as described with reference to FIGS. 5 through 7.

At block 1310 the UE 115 or base station 105 may select a communication mode from a plurality of communication modes for communication in the unlicensed radio frequency spectrum band, wherein the communication mode comprises at least one of a frequency hopping configuration, an LBT configuration, or a DTX duty cycle. The operations of block 1310 may be performed according to the methods described with reference to FIGS. 1 through 4. In certain examples, aspects of the operations of block 1310 may be performed by a communication mode component as described with reference to FIGS. 5 through 7.

At block 1315 the UE 115 or base station 105 may identify a TDD frame structure based at least in part on the LBT configuration associated with the selected communication mode, wherein communicating in the one or more narrowband regions of the unlicensed radio frequency spectrum band is based at least in part on the TDD frame structure. The operations of block 1315 may be performed according to the methods described with reference to FIGS. 1 through 4. In certain examples, aspects of the operations of block 1315 may be performed by a frame structure component as described with reference to FIGS. 5 through 7.

At block 1320 the UE 115 or base station 105 may communicate in the one or more narrowband regions of the unlicensed radio frequency spectrum band using the communication mode. The operations of block 1320 may be performed according to the methods described with reference to FIGS. 1 through 4. In certain examples, aspects of the operations of block 1320 may be performed by a receiver or a transmitter as described with reference to FIGS. 5 through 7.

Figure 14:
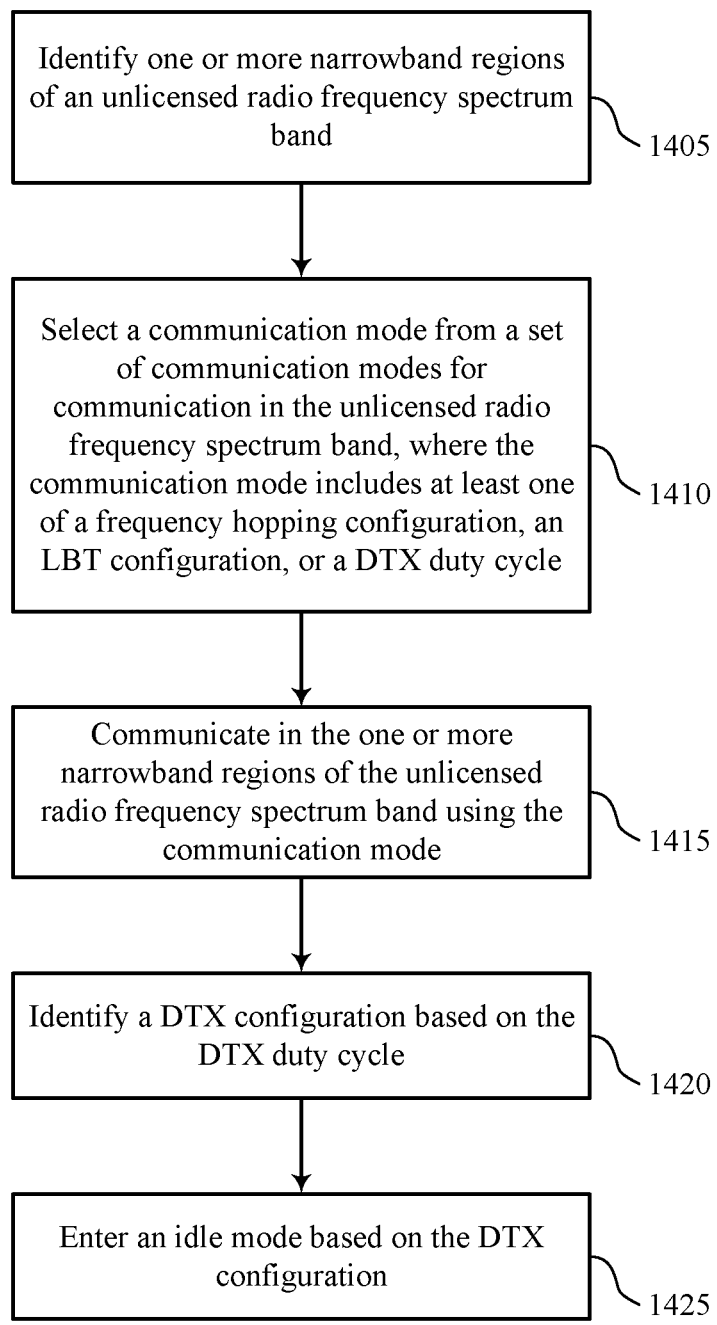

FIG. 14 shows a flowchart illustrating a method 1400 for unlicensed spectrum operation for NB-IoT and eMTC in accordance with various aspects of the present disclosure. The operations of method 1400 may be implemented by a UE 115 or its components as described herein. For example, the operations of method 1400 may be performed by a narrowband communication manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify one or more narrowband regions of an unlicensed radio frequency spectrum band. The operations of block 1405 may be performed according to the methods described with reference to FIGS. 1 through 4. In certain examples, aspects of the operations of block 1405 may be performed by an unlicensed spectrum component as described with reference to FIGS. 5 through 7.

At block 1410 the UE 115 may select a communication mode from a plurality of communication modes for communication in the unlicensed radio frequency spectrum band, wherein the communication mode comprises at least one of a frequency hopping configuration, an LBT configuration, or a DTX duty cycle. The operations of block 1410 may be performed according to the methods described with reference to FIGS. 1 through 4. In certain examples, aspects of the operations of block 1410 may be performed by a communication mode component as described with reference to FIGS. 5 through 7.

At block 1415 the UE 115 may communicate in the one or more narrowband regions of the unlicensed radio frequency spectrum band using the communication mode. The operations of block 1415 may be performed according to the methods described with reference to FIGS. 1 through 4. In certain examples, aspects of the operations of block 1415 may be performed by a receiver or a transmitter as described with reference to FIGS. 5 through 7.

At block 1420 the UE 115 may identify a DTX configuration based at least in part on the DTX duty cycle. The operations of block 1420 may be performed according to the methods described with reference to FIGS. 1 through 4. In certain examples, aspects of the operations of block 1420 may be performed by a DTX component as described with reference to FIGS. 5 through 7.

At block 1425 the UE 115 may enter an idle mode based at least in part on the DTX configuration. The operations of block 1425 may be performed according to the methods described with reference to FIGS. 1 through 4. In certain examples, aspects of the operations of block 1425 may be performed by a DTX component as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, an eNB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields of particles, optical fields of particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a narrowband region of an unlicensed radio frequency spectrum band for communication with a wireless device;
   determining a geographic operating region for the wireless device;
   selecting a communication mode from a plurality of communication modes for communication in the unlicensed radio frequency spectrum band based at least in part on the narrowband region and the geographic operating region for the wireless device, wherein the communication mode indicates that frequency hopping is enabled for the communication in the unlicensed radio frequency spectrum band, wherein a configurable number of time division duplexed frames are grouped into a hopping frame block; and
   communicating with the wireless device in the narrowband region of the unlicensed radio frequency spectrum band using the communication mode.

2. The method of claim 1, further comprising:
   receiving a system information broadcast in the narrowband region, wherein the communication mode or the geographic operating region is identified based at least in part on the system information broadcast.

3. The method of claim 1, further comprising:
   transmitting a system information broadcast in the narrowband region, wherein the system information broadcast identifies the communication mode or the geographic operating region.

4. The method of claim 1, wherein the communication mode is based at least in part on a regulatory restriction of the geographic operating region.

5. The method of claim 1, wherein the communication mode is selected based at least in part on a capability or category of the wireless device.

6. The method of claim 5, further comprising:
   transmitting an indication of the capability or category of the wireless device.

7. The method of claim 5, wherein the capability or category of the wireless device comprises a narrowband internet of things (NB-IoT) or enhanced machine type communication (eMTC) capability or category.

8. The method of claim 1, further comprising:
   identifying a number of frequency hopping channels based at least in part on the communication mode, wherein communicating in the narrowband region of the unlicensed radio frequency spectrum band is based at least in part on the number of frequency hopping channels.

9. The method of claim 1, wherein the communication mode further comprises a listen-before-talk (LBT) configuration, the method further comprising:
   identifying a time division duplexing (TDD) frame structure based at least in part on the LBT configuration, wherein communicating in the narrowband region of the unlicensed radio frequency spectrum band is based at least in part on the TDD frame structure.

10. The method of claim 9, wherein the LBT configuration comprises an active LBT configuration, and the TDD frame structure includes at least one LBT gap.

11. The method of claim 9, wherein the LBT configuration comprises an inactive LBT configuration, and the TDD frame structure includes a combination of uplink or downlink transmission time intervals (TTIs) and excludes an LBT gap.

12. The method of claim 9, wherein communicating comprises communicating in the narrowband region of the unlicensed radio frequency spectrum band during a first TDD frame having the TDD frame structure, the method further comprising:
    communicating in a second narrowband region of the unlicensed radio frequency spectrum band during a second TDD frame having the TDD frame structure.

13. The method of claim 9, wherein the TDD frame structure comprises a downlink portion and an uplink portion separated by at least one special transmission time interval (TTI).

14. The method of claim 1, wherein the communication mode further comprises a discontinuous transmission (DTX) duty cycle, the method further comprising:
    identifying a DTX configuration based at least in part on the DTX duty cycle; and
    entering an idle mode based at least in part on the DTX configuration.

15. An apparatus for wireless communication, comprising:
    means for identifying a narrowband region of an unlicensed radio frequency spectrum band for communication with a wireless device;
    means for determining a geographic operating region for the wireless device;
    means for selecting a communication mode from a plurality of communication modes for communication in the unlicensed radio frequency spectrum band based at least in part on the narrowband region and the geographic operating region for the wireless device, wherein the communication mode indicates that frequency hopping is enabled for the communication in the unlicensed radio frequency spectrum band, wherein a configurable number of time division duplexed frames are grouped into a hopping frame block; and means for communicating with the wireless device in the narrowband region of the unlicensed radio frequency spectrum band using the communication mode.

16. An apparatus for wireless communication, in a system comprising:

a processor;

a memory in electronic communication with the processor; and instructions stored in the memory and operable, when executed by the processor, to cause the apparatus to:

identify a narrowband region of an unlicensed radio frequency spectrum band for communication with a wireless device;

determine a geographic operating region for the wireless device;

select a communication mode from a plurality of communication modes for communication in the unlicensed radio frequency spectrum band based at least in part on the narrowband region and the geographic operating region for the wireless device, wherein the communication mode indicates that frequency hopping is enabled for the communication in the unlicensed radio frequency spectrum band, wherein a configurable number of time division duplexed frames are grouped into a hopping frame block; and communicate with the wireless device in the narrowband region of the unlicensed radio frequency spectrum band using the communication mode.

17. The apparatus of claim 16, wherein the instructions are further executable by the processor to cause the apparatus to:

receive a system information broadcast in the narrowband region; and identify the communication mode or the geographic operating region based at least in part on the system information broadcast.

18. The apparatus of claim 16, wherein the instructions are further executable by the processor to cause the apparatus to:

transmit a system information broadcast in the narrowband region, wherein the system information broadcast identifies the communication mode or the geographic operating region.

19. The apparatus of claim 16, wherein the communication mode is based at least in part on a regulatory restriction of the geographic operating region.

20. The apparatus of claim 16, wherein the communication mode is selected based at least in part on a capability or category of the wireless device.

21. The apparatus of claim 20, wherein the instructions are further executable by the processor to cause the apparatus to:

transmit an indication of the capability or category of the wireless device.

22. The apparatus of claim 20, wherein the capability or category of the wireless device comprises a narrowband internet of things (NB-IoT) or enhanced machine type communication (eMTC) capability or category.

23. The apparatus of claim 16, wherein the instructions are further executable by the processor to cause the apparatus to:

identify a number of frequency hopping channels based at least in part on the communication mode, wherein communicating in the narrowband region of the unlicensed radio frequency spectrum band is based at least in part on the number of frequency hopping channels.

24. The apparatus of claim 16, wherein the communication mode further comprises a listen-before-talk (LBT) configuration, and wherein the instructions are further executable by the processor to cause the apparatus to:

identify a time division duplexing (TDD) frame structure based at least in part on the LBT configuration, wherein communicating in the narrowband region of the unlicensed radio frequency spectrum band is based at least in part on the TDD frame structure.

25. The apparatus of claim 24, wherein the LBT configuration comprises an active LBT configuration, and the TDD frame structure includes at least one LBT gap.

26. The apparatus of claim 24, wherein the LBT configuration comprises an inactive LBT configuration, and the TDD frame structure includes a combination of uplink or downlink transmission time intervals (TTIs) and excludes an LBT gap.

27. The apparatus of claim 24, wherein communicating comprises communicating in the narrowband region of the unlicensed radio frequency spectrum band during a first TDD frame having the TDD frame structure, the instructions further executable by the processor to cause the apparatus to:

communicate in a second narrowband region of the unlicensed radio frequency spectrum band during a second TDD frame having the TDD frame structure.

28. The apparatus of claim 24, wherein the TDD frame structure comprises a downlink portion and an uplink portion separated by at least one special transmission time interval (TTI).

29. The apparatus of claim 16, wherein the communication mode further comprises a discontinuous transmission (DTX) duty cycle, and wherein the instructions are further executable by the processor to cause the apparatus to:

identify a DTX configuration based at least in part on the DTX duty cycle; and enter an idle mode based at least in part on the DTX configuration.

30. A non-transitory computer readable medium storing code for wireless communication, the code comprising instructions executable by a processor to:

identify a narrowband region of an unlicensed radio frequency spectrum band for communication with a wireless device;

determine a geographic operating region for the wireless device;

select a communication mode from a plurality of communication modes for communication in the unlicensed radio frequency spectrum band based at least in part on the narrowband region and the geographic operating region for the wireless device, wherein the communication mode indicates that frequency hopping is enabled for the communication in the unlicensed radio frequency spectrum band, wherein a configurable number of time division duplexed frames are grouped into a hopping frame block; and communicate with the wireless device in the narrowband region of the unlicensed radio frequency spectrum band using the communication mode.

* * * * *